United States Patent
Shima et al.

(10) Patent No.: US 10,246,038 B2
(45) Date of Patent: Apr. 2, 2019

(54) OBJECT RECOGNITION DEVICE AND VEHICLE CONTROL SYSTEM

(71) Applicant: Hitachi Automotive Systems, Ltd., Hitachinaka-shi, Ibaraki (JP)

(72) Inventors: Takeshi Shima, Tokyo (JP); Takuma Osato, Tokyo (JP); Masayuki Takemura, Tokyo (JP); Yuuji Otsuka, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/501,015

(22) PCT Filed: Aug. 7, 2015

(86) PCT No.: PCT/JP2015/072439
§ 371 (c)(1),
(2) Date: Feb. 1, 2017

(87) PCT Pub. No.: WO2016/031523
PCT Pub. Date: Mar. 3, 2016

(65) Prior Publication Data
US 2017/0217394 A1    Aug. 3, 2017

(30) Foreign Application Priority Data
Aug. 26, 2014 (JP) ................. 2014-172090

(51) Int. Cl.
  *B60R 21/0134*  (2006.01)
  *G05D 1/02*     (2006.01)
  (Continued)

(52) U.S. Cl.
  CPC ...... *B60R 21/0134* (2013.01); *B60K 31/0008* (2013.01); *B60R 21/00* (2013.01);
  (Continued)

(58) Field of Classification Search
  None
  See application file for complete search history.

(56) References Cited

U.S. PATENT DOCUMENTS

| | | | |
|---|---|---|---|
| 2007/0211919 A1 | 9/2007 | Nagaoka et al. | |
| 2009/0041302 A1* | 2/2009 | Nagaoka | G06K 9/00369 382/103 |

(Continued)

FOREIGN PATENT DOCUMENTS

| | | |
|---|---|---|
| JP | 2008-45974 A | 2/2008 |
| JP | 2008-242571 A | 10/2008 |

(Continued)

OTHER PUBLICATIONS

International Search Report (PCT/ISA/210) issued in PCT Application No. PCT/JP2015/072439 dated Nov. 24, 2015 with English translation (Two (2) pages).

(Continued)

*Primary Examiner* — Lail A Kleinman
(74) *Attorney, Agent, or Firm* — Crowell & Moring LLP

(57) ABSTRACT

The present invention addresses the problem of attaining an object recognition device that can change control of a vehicle in accordance with the reliability of detection of a target object. The object recognition device according to the present invention recognizes a target object around a vehicle and includes: a distance-information-based target object determination unit 106 that determines whether or not an object 303 is a target object by using distance information from the vehicle 301 to the object 303; an image-information-based target object determination unit 107 that determines whether or not the object 303 is a target object by using image information obtained by capturing an image of the object 303 from the vehicle 301; and a target object detection reliability calculation unit 108 that calculates the (Continued)

reliability of detection of a target object by using the distance information and the image information.

6 Claims, 12 Drawing Sheets

(51) Int. Cl.
| | |
|---|---|
| *B60K 31/00* | (2006.01) |
| *G01S 13/93* | (2006.01) |
| *G06K 9/00* | (2006.01) |
| *B60R 21/00* | (2006.01) |
| *G06T 1/00* | (2006.01) |
| *G08G 1/16* | (2006.01) |
| *B60W 30/09* | (2012.01) |
| *B60R 16/023* | (2006.01) |
| *B60T 7/22* | (2006.01) |

(52) U.S. Cl.
CPC .......... *B60W 30/09* (2013.01); *G01S 13/931* (2013.01); *G05D 1/0246* (2013.01); *G06K 9/00369* (2013.01); *G06K 9/00805* (2013.01); *G06T 1/00* (2013.01); *G08G 1/16* (2013.01); *B60R 16/0231* (2013.01); *B60T 7/22* (2013.01); *B60W 2420/42* (2013.01); *B60W 2420/62* (2013.01); *G01S 2013/935* (2013.01); *G01S 2013/9342* (2013.01); *G01S 2013/9346* (2013.01)

(56) References Cited

U.S. PATENT DOCUMENTS

| | | | |
|---|---|---|---|
| 2009/0303026 A1 | 12/2009 | Broggi et al. | |
| 2010/0253602 A1* | 10/2010 | Szczerba | G01S 13/723 345/8 |
| 2011/0001615 A1* | 1/2011 | Kuoch | B60R 21/0134 340/436 |
| 2015/0015384 A1 | 1/2015 | Shima et al. | |
| 2015/0278578 A1 | 10/2015 | Otsuka et al. | |
| 2015/0302259 A1* | 10/2015 | Oshida | B60R 1/00 382/103 |

FOREIGN PATENT DOCUMENTS

| | | |
|---|---|---|
| JP | 2013-58829 A | 3/2013 |
| JP | 2014-96005 A | 5/2014 |
| JP | 2014-109944 A | 6/2014 |
| WO | WO 2013/136878 A1 | 9/2013 |

OTHER PUBLICATIONS

Japanese-language Written Opinion (PCT/ISA/237) issued in PCT Application No. PCT/JP2015/072439 dated Nov. 24, 2015 with partial English translation (Six (6) pages).
European Search Report issued in counterpart European Application No. 15836656.7 dated May 7, 2018 (eight (8) pages).

* cited by examiner

FIG. 4
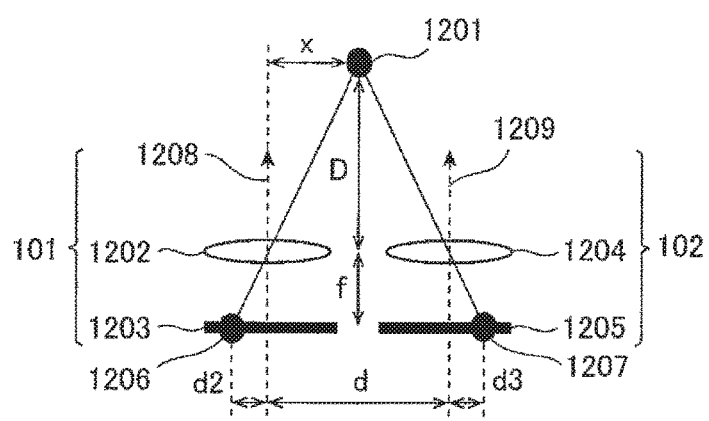
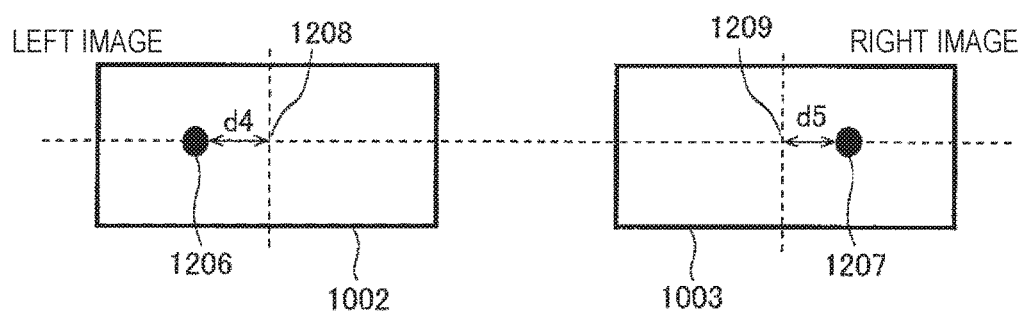

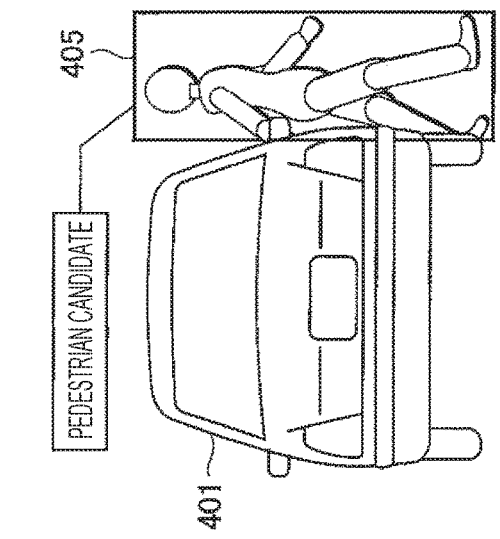
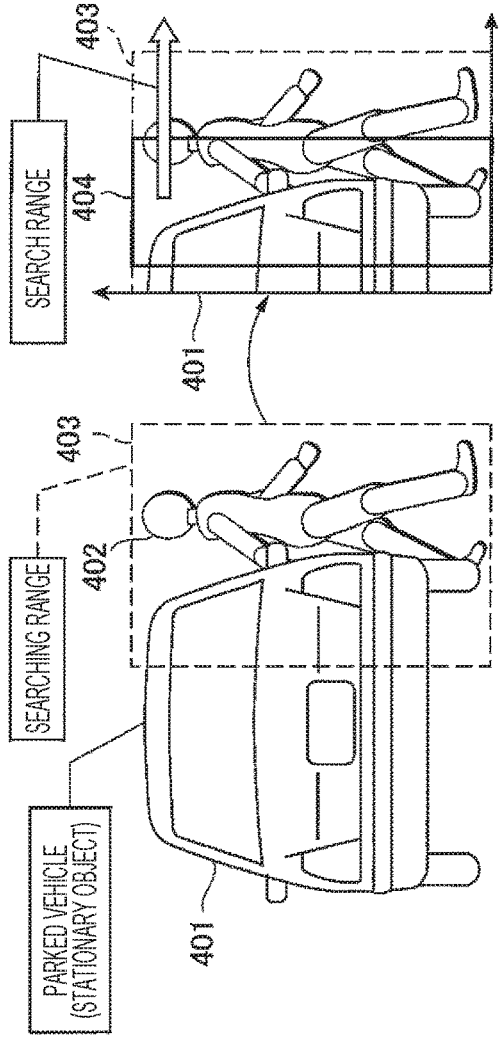

FIG. 12

| RELIABILITY | WARNING CONTROL | SPEED CONTROL |
|---|---|---|
| HIGH | O | BRAKE, ACCELERATOR, STEERING |
| INTERMEDIATE | O | BRAKE, ACCELERATOR |
| LOW | O | PREPARATION OF AUTOMATIC BRAKE, ACCELERATOR ACCELERATING OPERATION IMPOSSIBILITY |

OBJECT RECOGNITION DEVICE AND VEHICLE CONTROL SYSTEM

TECHNICAL FIELD

The present invention relates to an object recognition device and a vehicle control system for recognizing an object from image information of the outside world of an automobile.

BACKGROUND ART

In order to achieve safe driving of a vehicle, research and development on a device which automatically controls steering, accelerator and brake of a vehicle to detect a dangerous event around the vehicle and to avoid the detected dangerous event are being conducted, and such a device has been already mounted on some vehicles. Among them, a system that detects an obstacle such as vehicles or pedestrians in front of a vehicle with a camera mounted on the vehicle and gives warning to the driver or an automatic brake is effective in view of improving safety of the vehicle.

In a system which detects obstacles around an automobile from an image of a camera mounted on the automobile, it is particularly important to detect a pedestrian having a possibility of collision with the automobile in terms of the pedestrian protection. In particular, in order to improve safety, it is important to detect pedestrians jumping out of the shadow at an early stage and to perform braking control for preventing collision with pedestrians. Collision prevention performance against pedestrians jumping out of the shadow is also planned to be incorporated into a safety performance determination reference for European Euro-NCAP. Examples of a detecting sensor include a millimeter wave radar, a laser radar and a camera, but a method of using a camera, particularly a stereo camera, is described in PTL 1.

The contents described in PTL 1 disclose the invention in which a distance measuring unit based on monocular information and a distance measuring unit based on stereo information are used when an obstacle is detected by a stereo camera, a distance measuring unit based on the stereo information is used in the obstacle detection of a portion close to the vehicle, a distance measuring unit based on the monocular information is used in the obstacle detection in a portion remote from the vehicle, the two measuring units are switched by the detected distance, and particularly when there is a risk of a degradation of the accuracy, the distance which applies the distance measuring unit based on the stereo information is set to be longer.

CITATION LIST

Patent Literature

PTL 1: Japanese Unexamined Patent Application No. 2013-058829

SUMMARY OF INVENTION

Technical Problem

The method of PTL 1 switches the stereo information and the monocular information and uses only one of them. Therefore, the desired detection accuracy cannot be obtained with only single information, and there is a risk of difficulty in precisely controlling the vehicle.

The invention has been made in view of such circumstances, and an object of the invention is to provide an object recognition device capable of changing control of a vehicle depending on a detection reliability of a target object.

Solution to Problem

In order to solve the above issue, an object recognition device according to the present invention recognizes a target object around a vehicle, and includes: a distance information-based target object determination unit that determines whether or not an object is a target object, using distance information from the vehicle to the object; an image information-based target object determination unit that determines whether or not the object is the target object, using image information obtained by capturing an image of the object from the vehicle; and a target object detection reliability calculation unit that calculates detection reliability of the target object, using the distance information and the image information.

Advantageous Effects of Invention

According to the present invention, it is possible to change a warning method to the driver or a control method of the vehicle for preventing collision against the target object depending on the detection reliability of the target object. Therefore, even in a stage in which the detection result is uncertain, by performing previous preparation leading to the emergency brake, it is possible to further rapidly operate the emergency brake for the jumping pedestrian. Further, the object, configuration and effects other than those described above will be obvious from the description of the embodiments below.

BRIEF DESCRIPTION OF DRAWINGS

FIG. 4 is a diagram illustrating a method of calculating the parallax in the stereo camera.

FIGS. 7A-7C are diagrams illustrating a method of detecting a pedestrian candidate.

FIG. 12 is a diagram illustrating a relation between reliability and various controls.

DESCRIPTION OF EMBODIMENTS

Embodiments of the present invention will now be described with reference to the drawings.

First Embodiment

In the present embodiment, the description will be given of a case where an object recognition device of the present invention is applied to a vehicle control system that performs a collision avoiding operation for a pedestrian predicted to jump out of the shadow of a parked vehicle, using the image of the stereo camera mounted on the vehicle.

Figure 1:
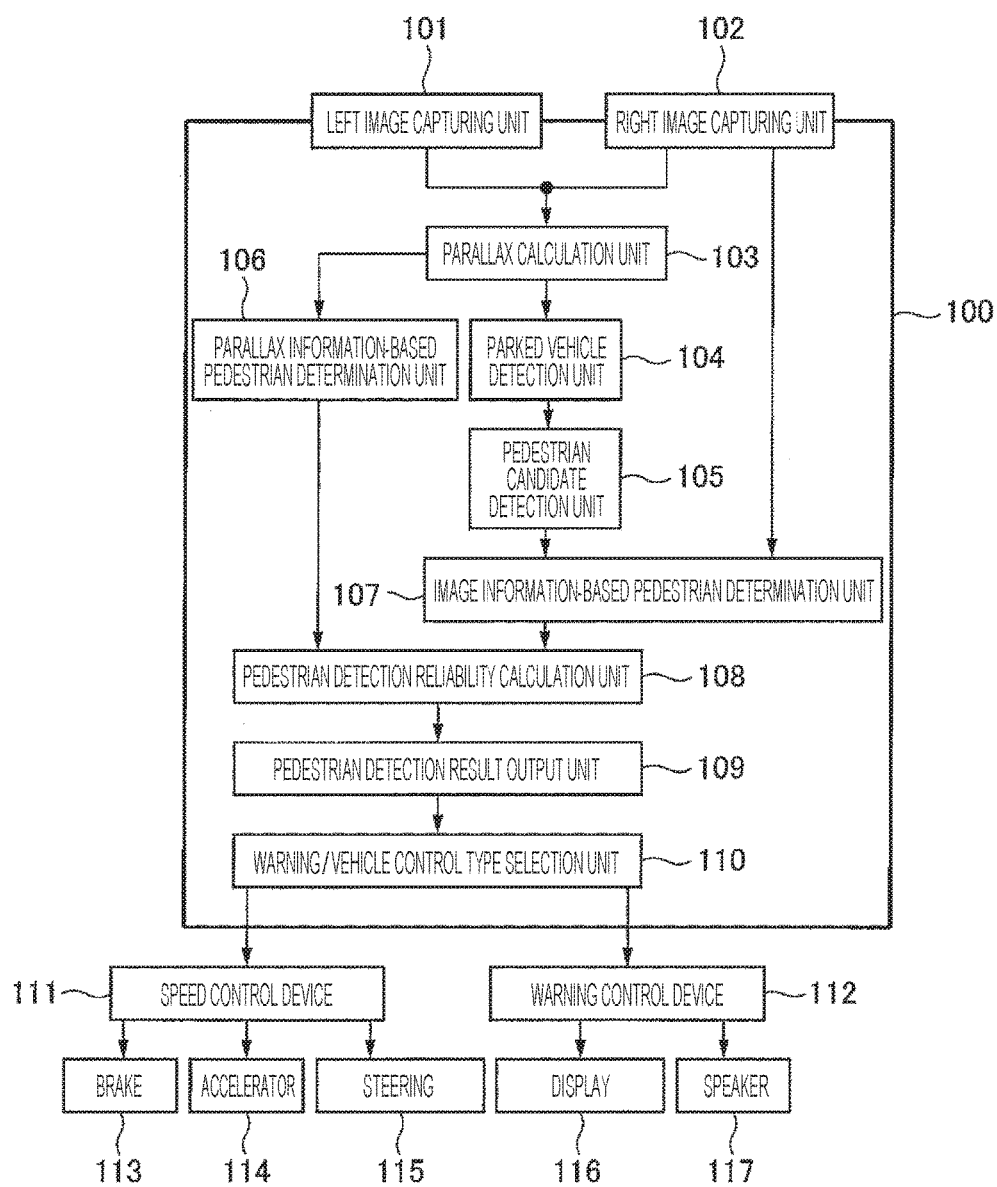
FIG. 1 is a diagram illustrating a configuration of a vehicle control system according to a first embodiment of the present invention.

First, the outline of the configuration of the vehicle control system according to the present embodiment will be described with reference to FIG. 1. FIG. 1 is a block diagram which achieves the vehicle control system according to the present embodiment. The vehicle control system recognizes a target object around the vehicle to perform a vehicle control or a warning control, and has a stereo camera 100, a speed control device 111, and a warning control device 112.

The stereo camera 100 has a left image capturing unit 101, a right image capturing unit 102, a parallax calculation unit 103, a parked vehicle detection unit 104, a pedestrian candidate detection unit 105, a parallax information-based pedestrian determination unit 106, an image information-based pedestrian determination unit 107, a pedestrian detection reliability calculation unit 108, a pedestrian detection result output unit 109, and an warning/vehicle control type selection unit 110.

The left image capturing unit 101 and the right image capturing unit 102 are mounted in a vehicle compartment in pairs, while having a preset base line length and being separated from each other in the left-right direction, capture the image of the front side in a vehicle traveling direction through a windshield of the vehicle, and output the image information thereof. The parallax calculation unit 103 calculates the distance, using the parallax which is a positional shift between the images captured by the left image capturing unit 101 and the right image capturing unit 102, and outputs the calculated distance as the parallax information.

The parked vehicle detection unit 104 detects parked vehicles parked on the side of the front road, based on the parallax information obtained by the parallax calculation unit 103. The pedestrian candidate detection unit 105 detects a pedestrian candidate who exists at a position close to the parked vehicle detected by the parked vehicle detection unit 104. Here, by setting a searching range at a position near the parked vehicle which is a stationary object, and by searching for a position where the distance information is dense, a pedestrian candidate is detected.

The image information-based pedestrian determination unit 107 determines whether the pedestrian candidate detected by the pedestrian candidate detection unit 105 has features of the pedestrian, by utilizing the right image information captured by the right image capturing unit 102, and determines that the pedestrian candidate is a pedestrian when there are many features of the pedestrian (image information-based target object determination unit). Further, the left image information which is captured by the left image capturing unit 101 instead of the right image capturing unit 102 may be used.

On the other hand, the parallax information-based pedestrian determination unit 106 determines whether there is a pedestrian as a target object in the entire captured image, using the parallax information obtained by the parallax calculation unit 103 (distance information-based target object determination unit). The pedestrian detection reliability calculation unit 108 calculates the reliability when determining whether the object is a pedestrian in the image information-based pedestrian determination unit 107 and the parallax information-based pedestrian determination unit 106 (target object detection reliability calculation unit). The pedestrian detection result output unit 109 integrates the results of the image information-based pedestrian determination unit 107, the parallax information-based pedestrian determination unit 106 and the pedestrian detection reliability calculation unit 108 to output the presence or absence of the pedestrian, the distance to the pedestrian, the relative speed, and the pedestrian detection reliability.

The warning/vehicle control type selection unit 110 selects types of warning and vehicle control based on the information from the pedestrian detection result output unit 109 (vehicle control type selection unit, warning control type selection unit). As a result of selection, in the case of preventing collision against a pedestrian detected by the speed control of the vehicle, an instruction related to control is transmitted to the speed control device (vehicle control device) 111, and the control signal is transmitted to a brake 113, an accelerator 114 or a steering 115. Further, as a result of selection, when a collision prevention to a pedestrian detected by warning to the driver is performed, an instruction related to warning is transmitted to the warning control device 112, and a control signal related to the warning is transmitted to a display 116 or a speaker 117. In the present embodiment, the description will be given of a case where both of the selection of the warning control and the selection of the vehicle control are performed by the warning/vehicle control type selection unit 110, but any one thereof may be used. In that case, the vehicle control system has a corresponding one of the speed control device 111 and the warning control device 112.

Figure 2:
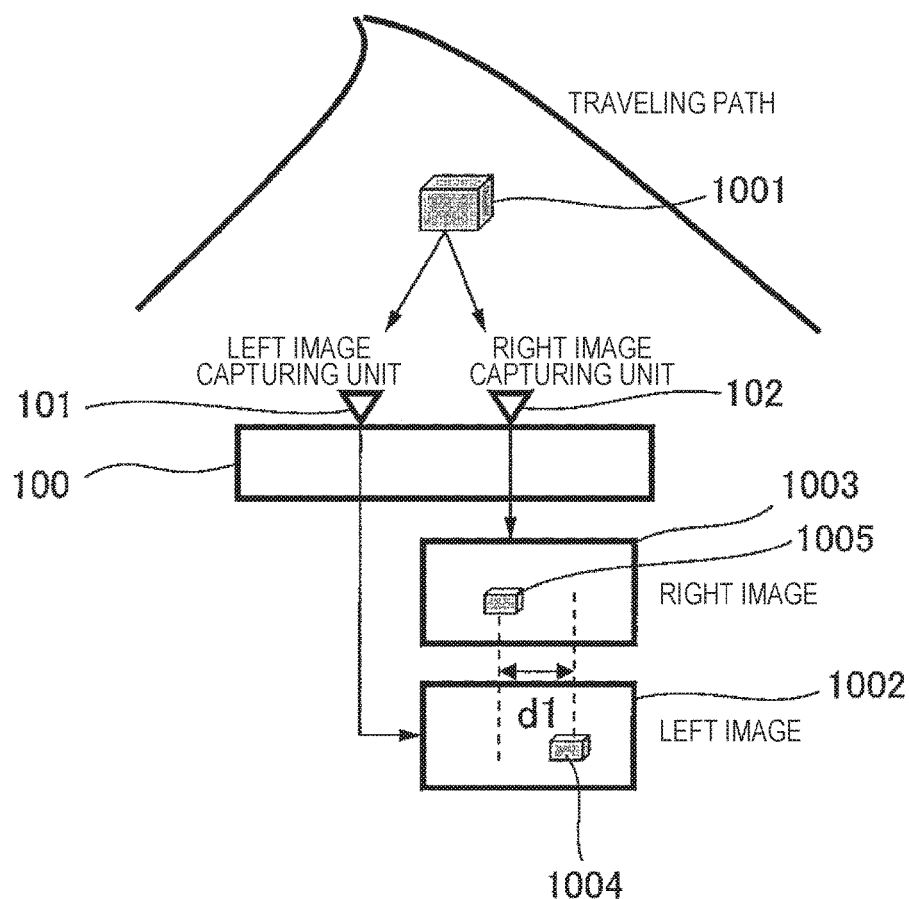
FIG. 2 is a diagram illustrating a method of calculating a parallax in a stereo camera.

Next, a method of calculating the parallax using the parallax calculation unit 103 of the stereo camera 100 of FIG. 1 will be described with reference to FIG. 2. Here, the left image input process and the right image input process are performed, and then, the corresponding point calculation process is performed. Specifically, the left and right image data captured by the left image capturing unit 101 and the right image capturing unit 102 are received. Further, by comparing the left and right image data, a part which captures the image of the same object is specified. That is, as illustrated in FIG. 2, when the image of an object 1001 on the traveling road is captured by the stereo camera 100, the images captured by the left image capturing unit 101 and the right image capturing unit 102 become each of a left image 1002 and a right image 1003. Here, the image of the same object 1001 is captured at a position 1004 in the left image 1002 and is captured at a position 1005 in the right image 1003. Thus, a deviation of $d_1$ occurs in the lateral direction of the image. Therefore, it is necessary to specify that the specific object captured at the position 1004 of the left image 1002 is captured at which position of the right image 1003.

Figure 3:
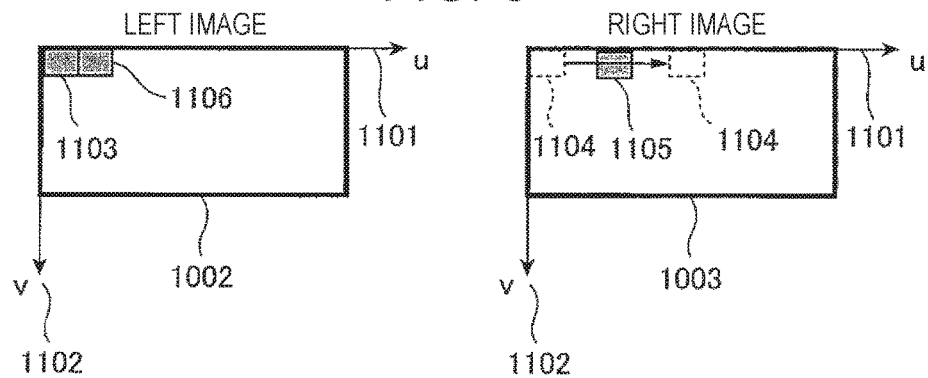
FIG. 3 is a diagram illustrating a method of calculating the parallax in the stereo camera.

A method of specifying that the specific object captured in the left image 1002 is captured at which position of the right image 1003 will be described with reference to FIG. 3. In FIG. 3, with respect to the coordinate system of the left image 1002 and the right image 1003, a horizontal direction is set as a u-axis 1101, and a vertical direction is set as a v-axis 1102. First, in the left image 1002, a rectangular area 1103 surrounded by $(u_1, v_1)$, $(u_1, v_2)$, $(u_2, v_1)$ and $(u_2, v_2)$ is set in the uv coordinate system.

Next, in a region surrounded by $(U, v_1)$, $(U, v_2)$, $(U+(u_2-u_1), v_1)$ and $(U+(u_2-u_1), v_2)$ in the right image 1003, the U value increases from u=0 to u=u$_3$, and a rectangular area 1104 is scanned in the right direction of the image. Upon scanning, by comparing the correlation value between the image in the rectangular area 1103 and the image in the rectangular area 1104, the same object as the object captured in the rectangular area 1103 is captured at the positions $(u_4, v_1)$, $(u_4, v_2)$, $(u_4+(u_2-u_1), v_1)$ and $(u_4+(u_2-u_1), v_2)$ of a rectangular area 1105 of the right image 1003 having the highest correlation with the rectangular area 1103 of the left image 1002. Here, it is assumed that each pixel in the rectangular area 1103 corresponds to each pixel in the rectangular area 1105. In a case where there is no rectangle having a correlation value of a certain value or more when scanning the rectangular area 1104 of the right image 1003, there is no corresponding point in the right image 1003 corresponding to the rectangular area 1103 of the left image 1002.

Next, the rectangular area of the left image 1002 is shifted to the position of 1106, and the same process is performed. In this way, the rectangular area of the left image 1002 is scanned over the entire inside of the left image 1002, and the corresponding points in the right image 1003 are obtained for all the pixels of the left image 1002. When no corresponding point is found, it is assumed that there is no corresponding point.

Next, a distance calculation process is performed. Here, the parallax is equivalent to the distance, and the parallax data is converted into distance data in this process. In the distance calculation process, with respect to the corresponding points of the left image 1002 and the right image 1003 which are obtained by the corresponding point calculation process and capture the image of the same object, it is calculated that each corresponding point is located at a position to what extent from the stereo camera 100.

A method of calculating the distance from the camera of the corresponding point 1201 between the left image 1002 and the right image 1003 will be described with reference to FIG. 4. In FIG. 4, the left image capturing unit 101 is a camera which has a focal length f formed by a lens 1202 and an image capturing surface 1203, and an optical axis 1208. The right image capturing unit 102 is a camera which has a focal length f formed by a lens 1204 and an image capturing surface 1205, and an optical axis 1209. A point 1201 in front of the camera is captured to a point 1206 (the distance of d$_2$ from the optical axis 1208) of the image capturing surface 1203 of the left image capturing unit 101, and is a point 1206 (position of d$_4$ pixel from the optical axis 1208) in the left image 1002. Similarly, a point 1201 in front of the camera is captured at a point 1207 (a distance of d$_3$ from the optical axis 1209) on the image capturing surface 1205 of the right image capturing unit 102, and is a point 1207 (a position of d$_5$ pixel from the optical axis 1209) in the right image 1003.

In this way, the point 1201 of the same object is captured at the position of d$_4$ pixel from the optical axis 1208 to the left in the left image 1002, and is captured at the position of d$_5$ from the optical axis 1209 to the right in the right image 1003. Thus, the parallax of d$_4$+d$_5$ pixels occurs. Therefore, when the distance between the optical axis 1208 of the left image capturing unit 101 and the point 1201 is set as x, the distance D from the stereo camera 100 to the point 1201 can be obtained by the following formula.

From the relation between the point 1201 and the left image capturing unit 101, $d_2:f=x:D$ From the relation between the point 1201 and the right image capturing unit 102, $d_3:f=(d-x):D$ Therefore, $D=f\times d/(d_2+d_3)=f\times d/\{(d_4+d_5)\times a\}$. Here, a is the size of the imaging elements of the image capturing surfaces 1203 and 1205.

The aforementioned distance calculation is performed on all the corresponding points calculated by the aforementioned corresponding point calculation process. As a result, it is possible to obtain a distance image which represents the distance from the stereo camera 100 to the object, and the distance image (distance information) and the parallax image (parallax information) can be handled as an equivalence.

Figure 5:
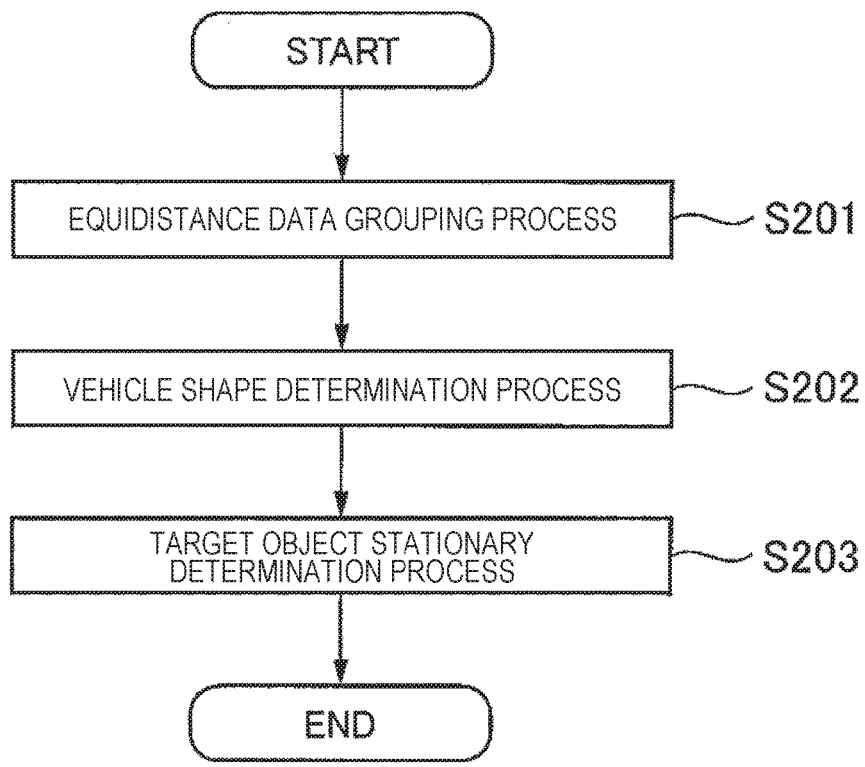
FIG. 5 is a flowchart illustrating the contents of process in a parked vehicle detection unit.

Next, with reference to FIG. 5, a process executed in the parked vehicle detection unit 104 of the stereo camera 100 of FIG. 1 will be described. FIG. 5 is a process flow executed by the parked vehicle detection unit 104.

First, in the same distance data grouping process S201, the distance to the target object captured at each pixel of the image is calculated from the parallax information calculated by the parallax calculation unit 103 of FIG. 1, and the distances falling within a range of certain fixed value are grouped.

Next, in the vehicle shape determination process S202, pixels grouped in the same distance data grouping process S201 of preprocess are extracted, and it is determined whether the shape and size of the group of the extracted pixels are similar to the shape and size of the rear surface of the vehicle. If the shape and size are similar to those of the rear surface of the vehicle, the target object is determined to be a vehicle. Here, the shape similar to the rear surface of the vehicle is a rectangular shape including a general passenger car and a large vehicle, and a size similar to the rear surface of the vehicle is set as a size including a general passenger car and a large vehicle and is defined beforehand.

When the target object is determined to be a vehicle in the vehicle shape determination process S202, the process proceeds to the target object stationary determination process S203. In the target object stationary determination process S203, it is determined whether or not the target object is a stationary vehicle. Whether or not the vehicle is stationary can be determined by comparing the traveling speed of the vehicle with the relative approach speed of the vehicle as the target object.

Next, the pedestrian candidate detection unit 105 of the stereo camera 100 of FIG. 1 will be described with reference to FIGS. 6(*a*) to 8. FIGS. 6(*a*) and 6(*b*) are diagrams illustrating a state in which a pedestrian is predicted to jump out of the shadow of a parked vehicle toward the front of the vehicle, FIGS. 7(*a*) to 7(*c*) are diagrams illustrating a method of detecting a pedestrian candidate, and FIG. 8 is a flowchart illustrating the content of the process in the pedestrian candidate detection unit.

Figure 8:
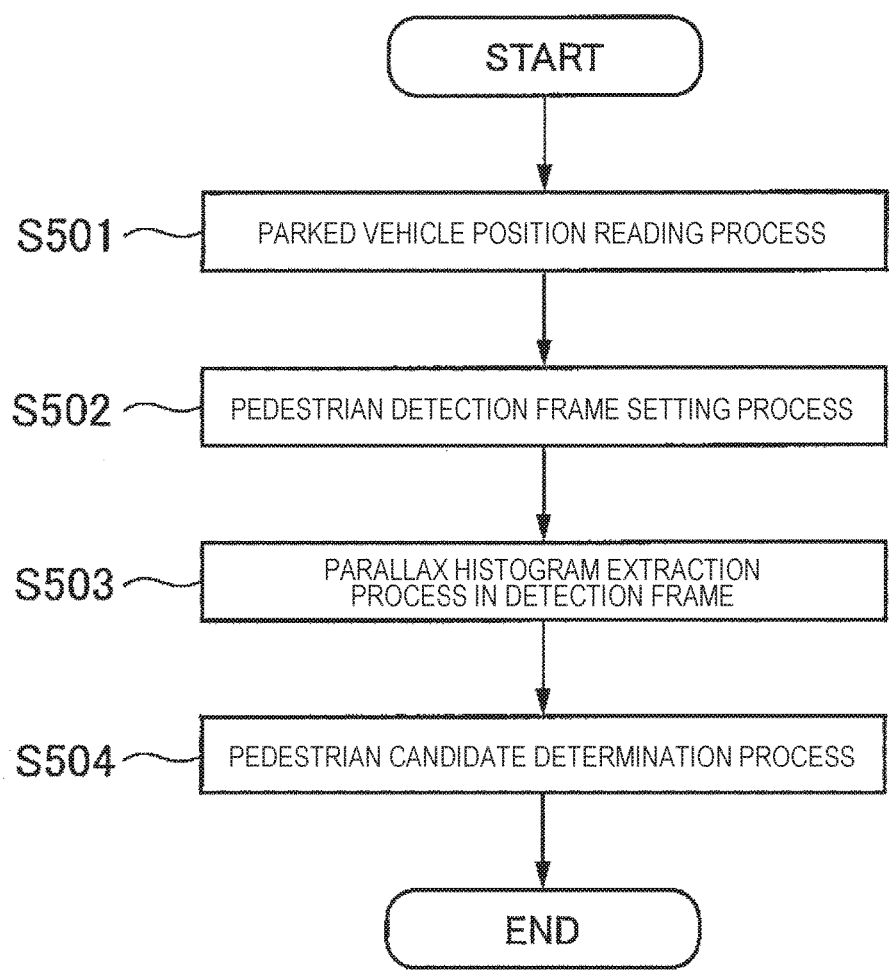
FIG. 8 is a flowchart illustrating the contents of process in a pedestrian candidate detection unit.

First, in a parked vehicle position reading process S501 illustrated in FIG. 8, the position of the parked vehicle (stationary object) detected by the parked vehicle detection unit 104 is read. Further, in a pedestrian detection frame setting process S502, a searching range for detecting a pedestrian is set at a position where the distance information to the parked vehicle is dense, and a detection frame for searching for the searching range is set. Further, a parallax histogram in the detection frame is extracted in a parallax histogram extraction process S503 in the detection frame, and a pedestrian candidate region is set in the pedestrian candidate determination process S504.

Figure 6A:
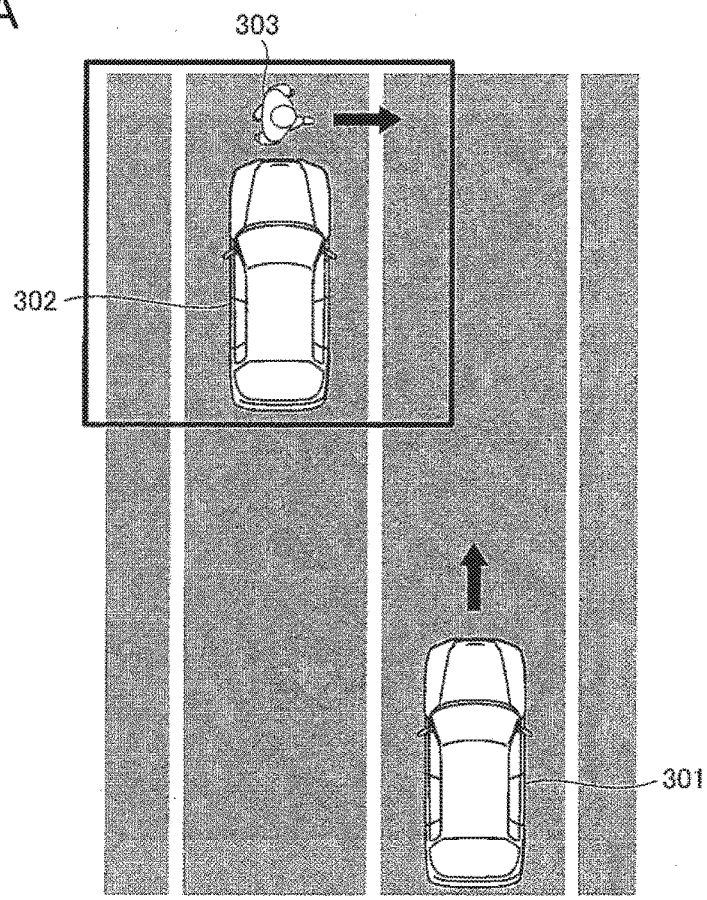
FIGS. 6A and 6B are diagrams illustrating a state in which a pedestrian jumps out of the shadow of the parked vehicle toward the front of the vehicle.
Figure 6B:
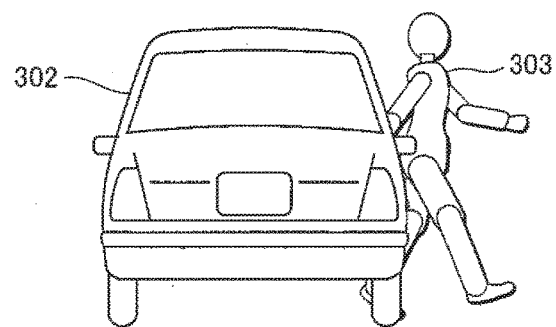

For example, as illustrated in FIG. 6(a), when the parked vehicle 302 is on the left front side of the vehicle 301 and the pedestrian 303 is in the shadow of the parked vehicle 302 as illustrated in FIG. 6(b), the position of the parked vehicle 302 is detected by the parked vehicle detection unit 104, and is read by the parked vehicle position reading process S501. In such a situation, as illustrated in FIG. 7(a), a searching range 403 for searching for a pedestrian 402 predicted to jump out of the shade of a parked vehicle 401 is set in the vicinity of the parked vehicle 401. Further, as illustrated in FIG. 7(b), a detection frame 404 for detecting the pedestrian 402 is moved within the searching range 403 to search for the pedestrian 402, and as illustrated in FIG. 7(c), as a result of the search, a pedestrian candidate region 405 which is a region assumed to be the pedestrian 402 on the image is determined.

Figure 9B:
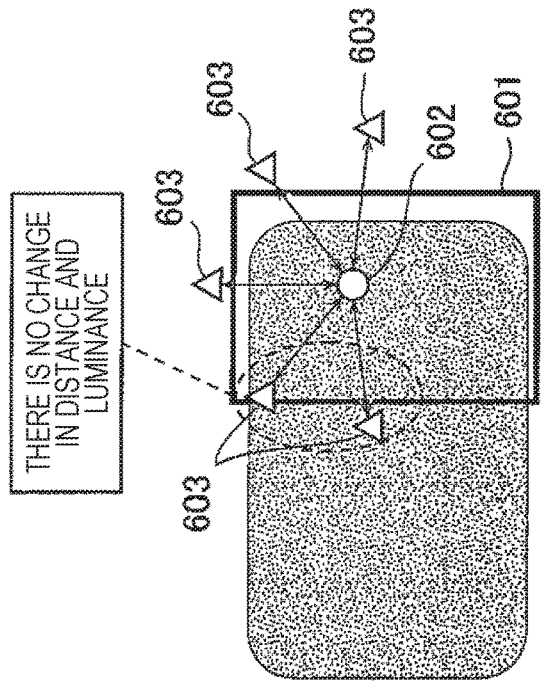
FIGS. 9A and 9B are diagrams illustrating a determination method in an image information-based pedestrian determination unit.
Figure 9A:
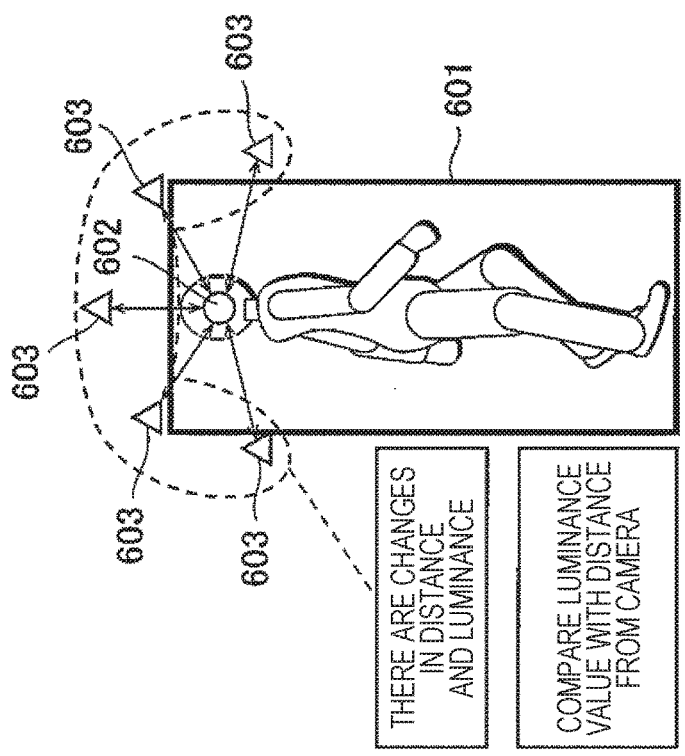

Next, the image information-based pedestrian determination unit 107 of FIG. 1 will be described with reference to FIGS. 9(a) and 10. FIGS. 9(a) and 9(b) are diagrams illustrating a determination method in the image information-based pedestrian determination unit 107, and FIG. 10 is a flowchart illustrating the content of the process in the image information-based pedestrian determination unit.

Figure 10:
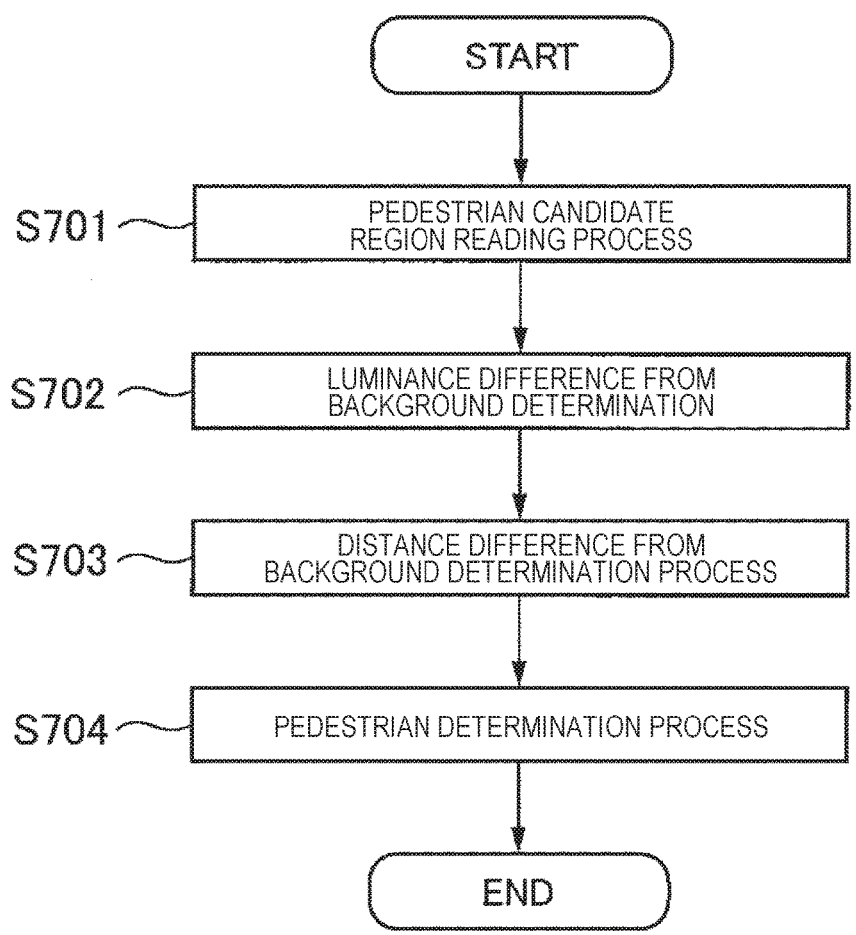
FIG. 10 is a flowchart illustrating the contents of process in the image information-based pedestrian determination unit.

First, in a pedestrian candidate region reading process S701 illustrated in FIG. 10, the image information of the pedestrian candidate region 405 detected by the pedestrian candidate detection unit 105 is read. In a luminance difference from background determination process S702, the presence or absence of the luminance difference between the pedestrian and its background is determined. Similarly, in the distance difference from background determination process S703, the presence or absence of the distance difference between the pedestrian and its background is determined. Further, a pedestrian determination process S704 is performed which determines whether the pedestrian candidate is a pedestrian in accordance with the distance difference/luminance difference with the background which is each of the determination results of the luminance difference from background determination process S702 and the distance difference from background determination process S703.

In the luminance difference from background determination process S702 and the distance difference from background determination process S703, as illustrated in FIG. 9(a), a place assumed to be a pedestrian in a pedestrian candidate frame 601 is set as a reference point 602, and a comparison point 603 is set outside the pedestrian candidate frame 601. The number for setting the reference point 602 and the comparison point 603 is not limited to one, and a plurality of numbers may be set.

In the pedestrian determination process S704, it is determined whether there is a change by comparing the reference point 602 and the comparison point 603, in other words, by comparing the luminance value and the distance from the camera, respectively, between the reference point 602 and the comparison point 603, it is determined whether there is a difference equal to or more than a predetermined value. For example, as illustrated in FIG. 9(a), when there is a change in either one of the luminance value and the distance, that is, when there is a difference equal to or more than a predetermined value in one of the luminance value and the distance, the pedestrian candidate is determined as a pedestrian.

On the other hand, as illustrated in FIG. 9(b), the luminance value and the distance from the camera are compared, respectively, between the reference point 602 and the comparison point 603, and when there is no change in both, that is, when there is no difference equal to or more than a predetermined value in both of the luminance value and the distance, it is determined that the pedestrian candidate is not a pedestrian. Further, the process contents of the aforementioned pedestrian determination process S704 are merely an example, and the pedestrian determination may be performed, for example, using a known technique such as template matching.

Figure 11:
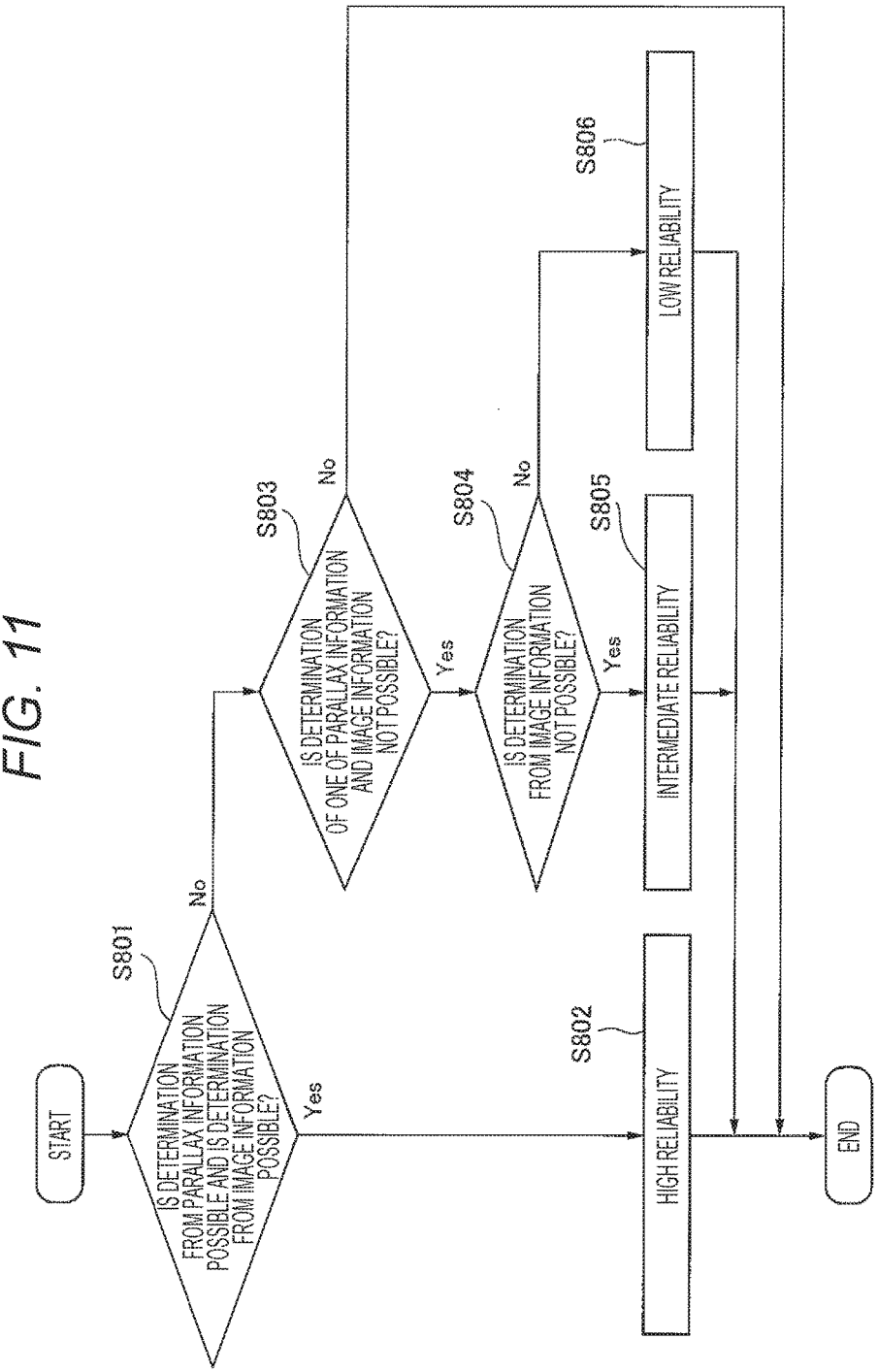
FIG. 11 is a flowchart illustrating the contents of process in a pedestrian detection reliability calculation unit.

Next, the pedestrian detection reliability calculation unit 108 of FIG. 1 will be described with reference to FIG. 11. FIG. 11 is a flowchart illustrating the contents of process in the pedestrian detection reliability calculation unit 108.

In the pedestrian detection reliability calculation unit 108, it is determined whether a pedestrian can be determined from the parallax information, and a pedestrian can be determined from the image information (step S801). Specifically, it is determined whether the target object is determined as a pedestrian in the parallax information-based pedestrian determination unit 106, and the target object is determined as a pedestrian in the image information-based pedestrian determination unit 107.

Further, when the target object is determined as a pedestrian in both of the parallax information and the image information, that is, when the target object is determined as a pedestrian in the parallax information-based pedestrian determination unit 106 and the target object is determined as a pedestrian in the image information-based pedestrian determination unit 107 (YES in step S801), the reliability of pedestrian detection is determined to be high (step S802).

On the other hand, when it is not possible to determine the target object as a pedestrian in at least one of the parallax information and the image information, that is, when it is not possible to determine the target object as a pedestrian in at least one of the parallax information-based pedestrian determination unit 106 and the image information-based pedestrian determination unit 107, it is determined whether it is not possible to perform the determination by either one or both of them (step S803).

Here, when it is determined that the target object cannot be determined as a pedestrian in both of the parallax information-based pedestrian determination unit 106 and the image information-based pedestrian determination unit 107 (NO in step S803), it is assumed that the pedestrian cannot be found, and the routine is finished.

Further, when it is not possible to determine the target object as a pedestrian in one of the parallax information-based pedestrian determination unit 106 and the image information-based pedestrian determination unit 107 (YES in step S803), the process proceeds to step S804 to determine either one of them.

In step S804, it is determined whether the target object cannot be determined as a pedestrian from the image information. When it is determined that the target object cannot be determined as a pedestrian from the image information (YES in step S804), that is, when it is determined that the target object can be determined as a pedestrian in the parallax information, the reliability of pedestrian detection is determined to be intermediate (step S805).

On the other hand, when it is determined that the target object can be determined as a pedestrian only from the image information in step S804 (NO in step S804), that is, when it is determined that the target object cannot be determined as a pedestrian in the parallax information, the reliability of pedestrian detection is determined to be low (step S806).

When it is determined that the target object can be determined as a pedestrian in both of the image information and the parallax information, the reliability of pedestrian detection is set to the highest degree. When the image information and the parallax information are compared, the parallax information has higher detection accuracy. Therefore, when it is determined that the target object can be determined as a pedestrian from the parallax information (YES in step S804), the reliability of pedestrian detection is set to be higher than a case where it is determined that the target object cannot be determined as a pedestrian from the image information (NO in step S804).

Next, the warning/vehicle control type selection unit 110 of FIG. 1 will be described with reference to FIG. 12. FIG. 12 is a diagram illustrating a relation between reliability and various controls.

For example, as illustrated in FIG. 12, when the reliability is determined to be high by the pedestrian detection reliability calculation unit 108, the brake control, the accelerator control, and the steering control are performed as speed control by the speed control device 111. In the brake control, for example, when the distance between the vehicle and the pedestrian becomes shorter than a predetermined distance, an automatic braking control of automatically applying the braking force to decelerate the vehicle is performed. In the accelerator control, a control of operating a throttle valve in a closing direction to decelerate the vehicle by the engine brake is performed. In the steering control, in order to prevent a collision with a pedestrian, a control of automatically adjusting the steering angle to change the traveling direction of the vehicle is performed. Further, as a warning control of the warning control device 112, an indication of performing the brake control, the accelerator control and the steering control is displayed on the display 116 in the passenger compartment, and a warning sound and an announcement for performing such controls flows from the speaker 117, and attention to occupant is called.

When the reliability is determined to be intermediate, the brake control and the accelerator control are performed as the speed control, but the steering control is not performed. In the warning control, an indication of performing the brake control and the accelerator control is displayed on the display 116, and a warning sound and an announcement of such controls flow from the speaker 117.

Further, when the reliability is determined to be low, as the speed control, a preparation for an automatic brake control such as increasing the fluid pressure of the brake fluid so that the brake can be operated at any time, and an accelerator control, in which the throttle valve is not operated correspondingly even if the accelerator pedal is depressed and the acceleration of the vehicle is suppressed, are performed. In the warning control, the presence of a pedestrian is displayed on the display 116, and an announcement that there is a pedestrian in front of the vehicle flows from the speaker 117.

According to the stereo camera 100 and the vehicle control system using the stereo camera 100, since the reliability of the pedestrian detection is calculated based on the parallax information and the image information, the reliability accuracy is high, and when the vehicle is controlled in accordance with the reliability, the high-accurate vehicle control can be performed.

According to the aforementioned vehicle control system, since the warning method to the driver or the control method of the vehicle for preventing the collision against the detected object are changed depending on the detection reliability, even when the detection result is uncertain, previous preparation leading to the emergency brake can be performed. Consequently, it is possible to more emergently operate the brake against pedestrians jumping out to the front of the vehicle, and it is possible to prevent collision even in a scene where the detection is difficult, such as pedestrians jumping out of the shadow.

Second Embodiment

Figure 13:
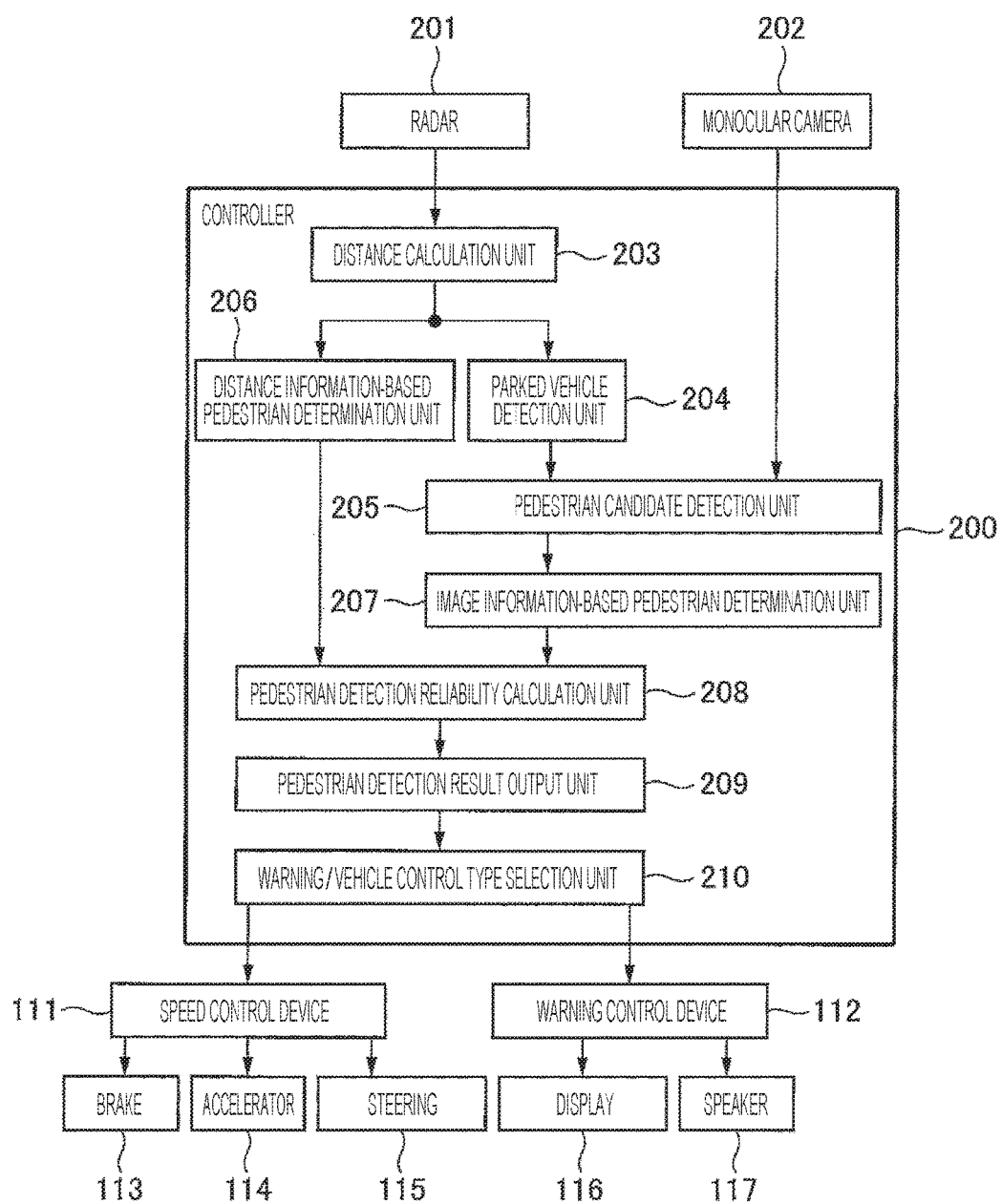
FIG. 13 is a diagram illustrating a configuration of a vehicle control system according to a second embodiment of the present invention.

Next, a second embodiment of the present invention will be described with reference to FIG. 13. FIG. 13 is a diagram illustrating the configuration of the vehicle control system according to the second embodiment. The same constituent elements as those of the first embodiment are denoted by the same names, and a detailed description thereof will not be provided.

The features of the present embodiment are in that an object recognition device of the present invention is configured to include a radar 201, a monocular camera 202 and a controller 200 instead of the stereo camera 100 in the first embodiment, and is applied to a vehicle control system. In the first embodiment, the distance information and the image information are acquired by the stereo camera, but in the present embodiment, the distance information is acquired by the radar 201 and the image information is acquired by the monocular camera 202.

The vehicle control system has the radar 201, the monocular camera 202, a controller 200, a speed control device 111, and a warning control device 112. The radar 201 may detect the position and size of the object in front of the vehicle, and it is possible to use a laser radar, a millimeter wave radar, or an infrared radar. The monocular camera 202 has a single image capturing unit which captures image of the front of the vehicle.

The controller 200 has a distance calculation unit 203, a parked vehicle detection unit 204, a pedestrian candidate detection unit 205, a distance information-based pedestrian determination unit 206, an image information-based pedestrian determination unit 207, a pedestrian detection reliability calculation unit 208, a pedestrian detection result output unit 209, and a warning/vehicle control type selection unit 210.

The distance calculation unit 203 calculates the distance from the vehicle to the target object based on the detection signal from the radar 201, and outputs the distance as the distance information. The parked vehicle detection unit 204 detects the parked vehicle based on the distance information from the distance calculation unit 203. The pedestrian candidate detection unit 205 performs a control of detecting a pedestrian candidate existing at a position close to the parked vehicle, based on the position information of the parked vehicle detected by the parked vehicle detection unit 204 and the image information from the monocular camera 202.

The image information-based pedestrian determination unit 207 determines whether the pedestrian candidate detected by the pedestrian candidate detection unit 205 has features of the pedestrian, using the image information captured by the monocular camera 202. When the pedestrian candidate has many features of pedestrian, the image information-based pedestrian determination unit 207 determines that the target object is a pedestrian.

The distance information-based pedestrian determination unit 206 determines whether there is a pedestrian to be detected in front of the vehicle, using the distance information obtained by the distance calculation unit 203, in other words, determines whether the target object existing in front of the vehicle is a pedestrian.

The pedestrian detection reliability calculation unit 208 calculates the reliability when it is determined whether the target object is a pedestrian in the image information-based pedestrian determination unit 207 and the distance information-based pedestrian determination unit 206. The pedestrian detection result output unit 209 integrates the results of the image information-based pedestrian determination unit 207, the distance information-based pedestrian determination unit 206, and the pedestrian detection reliability calculation unit 208 to output the presence or absence of a pedestrian, the distance and the relative speed to the pedestrian, and the pedestrian detection reliability. Since the warning/vehicle control type selection unit 210 is the same as that of the first embodiment, the description thereof will not be provided.

According to the present embodiment, it is possible to obtain the same operational effects as in the first embodiment. In addition, compared to the first embodiment, since there is no need to calculate the distance by a stereo vision, the calculation process load decreases, it is possible to achieve a device with a comparatively low specification, and the product price can be made inexpensive.

Although the embodiments of the present invention have been described in detail, the present invention is not limited to the above-described embodiments, and various design modifications may be made within a scope that does not depart from the spirit of the present invention described in the claims. For example, the above-described embodiments have been described in detail in order to describe the present invention to be easily understood, and are not necessarily limited to those having all the described configurations. In addition, a part of the configurations of the embodiment can be replaced by configurations of another embodiment, and the configurations of another embodiment can also be added to the configurations of the embodiment. Furthermore, it is possible to add, delete and replace other configurations with respect to some of the configurations of each embodiment.

REFERENCE SIGNS LIST

100 stereo camera
101 left image capturing unit
102 right image capturing unit
103 parallax calculation unit
104 parked vehicle detection unit
105 pedestrian candidate detection unit
106 parallax information-based pedestrian determination unit (distance information-based target object determination unit)
107 image information-based pedestrian determination unit (image information-based target object determination unit)
108 pedestrian detection reliability calculation unit (target object detection reliability calculation unit)
110 warning/vehicle control type selection unit (vehicle control type selection unit, warning control type selection unit)
111 speed control device (vehicle control device)
112 warning control device

The invention claimed is:

1. An object recognition device that recognizes a target object around a vehicle, the device comprising:
   a distance information-based target object determination unit that determines whether or not an object is a target object, using distance information from the vehicle to the object;
   an image information-based target object determination unit that determines whether or not the object is the target object, using image information obtained by capturing an image of the object from the vehicle;
   a target object detection reliability calculation unit that calculates detection reliability of the target object, using the distance information and the image information;
   a pair of left and right image capturing units that captures an image of the front of the vehicle, and a parallax calculation unit that calculates parallax information of the object based on the image information captured by the image capturing units, wherein
   the distance information-based target object determination unit determines whether or not an object in front of the vehicle is a pedestrian that is the target object, using the parallax information as the distance information,
   the image information-based target object determination unit detects a parked vehicle in front of the vehicle using the distance information, detects a pedestrian candidate in the vicinity of the parked vehicle using the image information, and determines whether the pedestrian candidate is a pedestrian using the image information and the distance information,
   the target object detection reliability calculation unit calculates the detection reliability of the pedestrian, using the determination result of the distance information-based target object determination unit and the determination result of the image information-based target object determination unit,
   the target object detection reliability calculation unit determines that the reliability is high, when the object in front of the vehicle is determined as the pedestrian by the distance information-based target object determination unit, and the pedestrian candidate is determined as the pedestrian by the image information-based target object determination unit,
   the target object detection reliability calculation unit determines that the reliability is low, when the object in front of the vehicle is not determined as the pedestrian by the distance information-based target object determination unit, and the pedestrian candidate is determined as the pedestrian by the image information-based target object determination unit, and
   the target object detection reliability calculation unit determines that the reliability is intermediate, when the object in front of the vehicle is determined as the pedestrian by the distance information-based target object determination unit, and the pedestrian candidate is not determined as the pedestrian by the image information-based target object determination unit.

2. The object recognition device according to claim 1, further comprising
   a vehicle control type selection unit that selects a type of vehicle control of the vehicle, based on the detection reliability of the pedestrian calculated by the target object detection reliability calculation unit.

3. The object recognition device according to claim 1, further comprising
   a warning control type selection unit that selects a type of warning control of the vehicle, based on the detection reliability of the pedestrian calculated by the target object detection reliability calculation unit.

4. A vehicle control system comprising the object recognition device according to claim 2, and a vehicle control device that executes a vehicle control selected by the vehicle control type selection unit of the object recognition device.

5. A vehicle control system comprising the object recognition device according to claim 3, and a warning control device that executes a warning control selected by the warning control type selection unit of the object recognition device.

6. The object recognition device according to claim 1, further comprising:
   a radar that detects an object in front of a vehicle;
   an image capturing unit that captures an image of the front of the vehicle; and
   a distance calculation unit that calculates distance information to an object detected by the radar,
   wherein the distance information-based target object determination unit determines whether or not an object in front of the vehicle is a pedestrian that is the target object, using the distance information,
   the image information-based target object determination unit detects a parked vehicle in front of the vehicle, using the distance information, detects a pedestrian candidate in the vicinity of the parked vehicle, using the image information, and determines whether the pedestrian candidate is a pedestrian using the image information and the distance information, and
   the target object detection reliability calculation unit calculates the detection reliability of the pedestrian, using the determination result of the distance information-based target object determination unit and the determination result of the image information-based target object determination unit.

* * * * *